[11] 3,572,902

[72] Inventor Toshi⎯
Tokyo, Japan
[21] Appl. No. 814,239
[22] Filed Apr. 8, 1969
[45] Patented Mar. 30, 1971
[73] Assignee Olympus Optical Co., Ltd.
Tokyo, Japan
[32] Priority Apr. 15, 1968
[33] Japan
[31] 43/24886

[54] HIGH MAGNIFICATION ACHROMATIC MICROSCOPE OBJECTIVE HAVING A WIDE, FLAT FIELD
1 Claim, 2 Drawing Figs.

[52] U.S. Cl............................................ 350/177,
350/214, 350/215, 350/234
[51] Int. Cl....................................... G02b 9/64,
G02b 21/02
[50] Field of Search........................... 350/175
(MO), 176, 177, 214, 215, 216

[56] References Cited
UNITED STATES PATENTS
| | | | | |
|---|---|---|---|---|
| 2,363,770 | 11/1944 | Bennett | | 350/177 |
| 3,174,396 | 3/1965 | Ruben | | 350/176 |
| 3,380,793 | 4/1968 | Klein | | 350/215 |
| 3,410,633 | 11/1968 | Young | | 350/215 |

*Primary Examiner*—John K. Corbin
*Attorney*—Otto John Munz

ABSTRACT: A high magnification microscope objective which has a wide field of about the field number of 30; in which the curvature of the field is sufficiently eliminated and the in-axis chromatic aberration is completely eliminated to the extent which is achieved by an apochromatic objective.

HIGH MAGNIFICATION ACHROMATIC MICROSCOPE OBJECTIVE HAVING A WIDE, FLAT FIELD

BACKGROUND OF THE INVENTION

The present invention relates to an objective for a microscope, and more particularly, to an object for a microscope which has a high magnifying power such as ranging between about 20 X and about 100 X and a very long durability without deteriorating its performance and in which the curvature of the field is sufficiently eliminated over the ultra-wide field such as the field number of 30 and, at the same time, the in-axis chromatic aberration is eliminated almost completely to the extent which is achieved by an apochromatic objective over the very wide aperture.

An objective of the type described above is very difficult in design as well as in manufacture, and very few objectives having superior quality have appeared in the market. Presently, plan-achromatic objectives have been in the market as the objectives of a microscope which can produce flat image surface over the wide field. The flatness of the image surface obtained by such plan-achromatic objectives is at the highest in a degree in which an eyepiece usually used in combination and having the field number of about 20 can be used together with the plan-achromatic objectives, and, therefore, it cannot be said that they are satisfactory. Further, they are constructed of conventional optical glasses, and the secondary spectrum of the in-axis chromatic aberration cannot be eliminated although the first spectrum thereof is eliminated, and, therefore, the chromatic aberration still remains partially. Quite recently, a plan-apochromatic objective is appearing in the market which can completely eliminate the secondary spectrum of the in-axis chromatic aberration. In general, it has been the common practice for removing the secondary spectrum of the in-axis chromatic aberration caused in an objective of the class of the apochromatic objective to use a crystal of alum as the material for making the concave lens element in the objective and a crystal of fluorite as the material for making the convex lens element, both the alum and the fluorite being of the isometric system. The reason for the above is due to the facts that both the above crystals very closely resemble each other in the nature of the partial dispersion ration thereof and they both have the characteristics by which the difference in the spherical aberration caused by the difference in color is difficult to take place. However, the alum is very expensive and, at the same time, it is very weak in mechanical strength thereby making the working of the alum very difficult. Further, the alum is not stable chemically, and, therefore, it will soon be subjected to deliquescence when it is left in the atmosphere, or it tends to lose the water of crystallization therefrom so that the devitrification will be effected. From the past, an apochromatic objective was said to be subjected to the devitrification within several years even though it was carefully maintained, thereby making the objective useless. This is the fatal defect of the prior art apochromatic objectives. This is chiefly due to the chemical instability of the alum crystal. In contrast to the above, a crystal of fluorite is relatively stable chemically, and semiapochromatic objectives incorporating crystal of fluorite in the lens system thereof have been in the market. They are inexpensive and, at the same, they have long durability. Therefore, they have been appreciated by the consumers in comparison with the apochromatic objectives, despite the fact that the correction of the chromatic aberration obtained by the semiapochromatic objectives is not sufficient in comparison with that obtained by the apochromatic objectives.

However, it is very difficult to design high-quality apochromatic objectives by using the fluorite only. Further, in a plan-apochromatic objective of the type in which a flat image surface is to be obtained, it is necessary to sufficiently correct the curvature of the field as well as the coma over the ultrawide field while the secondary spectrum of the in-axis chromatic aberration is eliminated, thus making the designing of the plan-apochromatic objective extremely difficult. The designing of a plan-apochromatic objective having a high magnifying power such as 40X, 100X and the like is particularly difficult because of the greater numerical aperture thereof.

SUMMARY OF THE INVENTION

Therefore, the object of the present invention is to provide a plan-apochromatic objective having a high magnifying power by using fluorite.

A further object of the present invention is to provide a plan-apochromatic objective of the type described above which has a magnifying power such as ranging between about 20X and about 100X and a very long durability without deteriorating its quality and in which the curvature of the field is sufficiently eliminated over the ultrawide field such as the field number of 30 and, at the same time, the in-axis chromatic aberration is eliminated almost completely over the very wide aperture.

These objects are achieved by an objective constructed in accordance with the present invention, which is characterized by:

A. a leading lens element at the object side in the form of a thick concave meniscus, the refractive power of the air contacting surface thereof which faces to the object satisfying the following condition:

$$1.0 \leq \left(\frac{n-1}{r}\right) F \leq 2.5$$

where:
  $r$ = the radius of curvature of the air contacting surface of the leading lens element,
  $F$ = the focal length of the entire lens system,
  $n$ = the refractive index of the leading lens element with respect to $d$ line;

B. a large air gap provided in the lens system, the amount of the air gap satisfying the following condition:

$$8.0 \geq \frac{d}{F} \geq 2.0$$

where:
  $d$ = the amount of the air gap.

C. the rearmost lens element in the forward lens group in the lens system which is separated by the air gap from the rearward lens group of the lens system being in the form of a convex meniscus, the convex surface of which is directed to face to the object, the focal length of the rearmost lens element satisfying the following condition:

$$10 \leq \frac{f_1}{F}$$

where:
  $f_1$ = the focal length of the rearmost lens element;

D. cemented achromatic surfaces, if provided in the lens system, the convex side of the cemented surfaces being arranged to face against the object;

E. the rearward lens group of the lens system being in the form of a convex meniscus as a whole, the first air contacting surface at the object side and the rearmost air contacting surface at the image side in the rearward lens group being arranged such that the convex sides thereof are directed toward the image side respectively;

F. the resultant focal length of the rearward lens group as a whole satisfying the following condition:

$$5.0 \leq \frac{f_2}{F}$$

where:
  $f_2$ = the resultant focal length of the rearward lens group;

G. at least two achromatic surfaces being provided in each of the forward and rearward lens groups of the lens system.

The physical function and effectiveness of each of the features of the above-described objective of the present invention will be described in detail hereinbelow.

CONDITION A

Arrangement of the leading lens element in the form of thick concave meniscus coaxial with respect to the object is an indispensable condition for eliminating the spherical aberration as well as the coma in an objective having a large aperture. To select the radius of curvature $r$ of the first surface of the leading lens element within the above-described range of the numerical value is necessary to completely eliminate the curvature of the field of the entire lens system over the ultrawide field such as reaching the field number of 30. In case the refractive power $(n-1)/r$ of the first surface is less than the above-described lower limit 1.0, serious undercorrection of the astigmatism will take place, thus making it impossible to correct the astigmatism by the corrective power obtainable from the lens elements located rearwardly of the leading lens element. Further, the annular band aberration due to the spherical aberration will increase. Also, the working distance, i.e. the distance between the cover glass and the air contacting surface of the objective at the object side thereof will be made shorter thereby making the operation of the microscope inconvenient. On the other hand, if the refractive power exceeds the above-described upper limit 2.5, the corrective power for the curvature of the field will be made insufficient, so that a sharp image cannot be formed over the ultrawide field such as reaching the field number of 30.

CONDITION B

This condition B is provided in order to maintain the balance between the conditions for the correction of the in-axis chromatic aberration and for the correction of the chromatic aberration due to the magnification in the entire lens system of the objective. And this condition is indispensable for the correction of the coma in the entire lens system, particularly for the correction of the coma in the off-axis light bundle at the ultrawide visual angle taking place in the range of field number of 30. If the value $d$ of the air gap is made less than the set lower limit, the in-axis chromatic aberration will be deteriorated thereby making the condition for correction of the in-axis chromatic aberration insufficient for an apochromatic objective. And the unsymmetry in the coma at the ultrawide visual angle in the range of the field number of 30 cannot be eliminated. On the other hand, if the value of the air gap exceeds the above-described upper limit, the degree of undercorrection of the chromatic aberration due to the magnification will be made serious thereby making it impossible to correct the same even though a corrective eyepiece is used in combination. Further, the interception of the off-axis light bundle at the wide visual angle will be made greater so that the light quantity at the marginal portion of the image will be made insufficient.

CONDITION C

This condition C is provided in order to maintain the working distance of the entire lens system in an appropriate value. If the value $f1/F$ is made less than the above-described lower limit 10, the corrective power for the annular band aberration due to the spherical aberration in the forward lens group will be deteriorated.

CONDITION D

This condition D is provided in order to maintain the balance in the coma and the spherical aberration in the forward lens group as well as the in-axis chromatic aberration. If the convex side of the cemented achromatic surfaces in the lens system is arranged to face to the image side, serious deterioration in the coma and the spherical aberration will take place.

CONDITION E

This condition E is provided in order to eliminate completely the residual aberration of the spherical aberration and the coma resulting from the leading lens element, i.e. the thick concave meniscus in the forward lens group and the convex meniscus located at the end of the forward lens group from the lens system of the objective in its entirety. If the above-referred convex surfaces in the rearward lens group are directed to face to the object side as a whole, then the corrective power for the respective above-recited aberrations will be lost.

CONDITION F

This condition F is provided in order to completely eliminate the in-axis chromatic aberration even the secondary spectrum thereof in cooperation with the following condition G. If the value $f_x/F$ is made less than the set lower limit 5.0, then the chromatic aberration due to the spherical aberration in the shorter wavelength caused by the overcorrection cannot be completely eliminated.

CONDITION G

Since an objective such as that of the present invention incorporates in the lens system meniscus lens elements having greater curvature in order to completely eliminate the curvature of the field over the ultrawide range of the field, serious undercorrection of the chromatic aberration due to magnification will necessarily take place by the provision of such meniscus lens elements. And, when the chromatic aberration due to the magnification is to be corrected, the in-axis chromatic aberration which is incompatible to the chromatic aberration due to the magnification will necessarily be deteriorated.

The condition G solves the above difficulty by providing at least two cemented achromatic surfaces in each of the forward and rearward lens groups so that the in-axis chromatic aberration is corrected to the degree attainable by an apochromatic objective.

Now an embodiment of the present invention will be described below in connection with the accompanying drawings.

DETAILED DESCRIPTION OF THE PREFERRED EMBODIMENT

Figure 1:
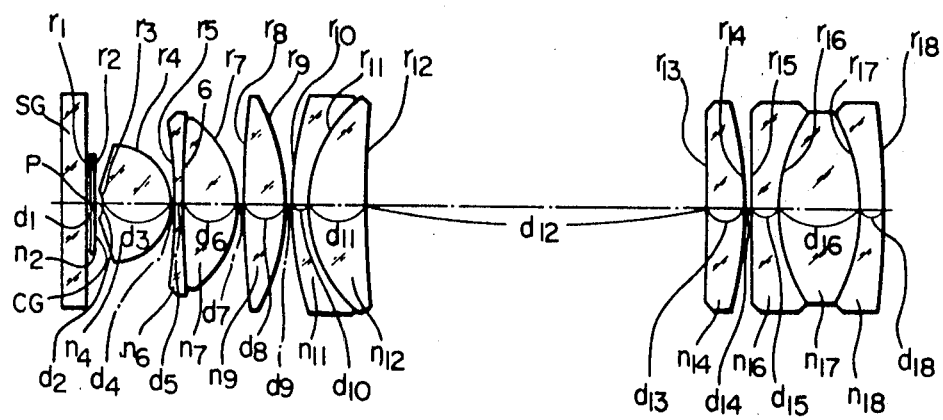
FIG. 1 is a longitudinal sectional view showing the construction of the embodiment of the objective in accordance with the present invention.

In FIG. 1, the embodiment of the objective of the present invention comprises a forward lens group consisting of six lens elements of which the second and third as well as the fifth and sixth lens elements from the object side are cemented with each other and a rearward lens group spaced a greater distance from the forward lens group by an air gap $d_{12}$, which rearward lens group consists of four lens elements of which the second, third and fourth lens elements from the object side are cemented with each other. A slide glass SG and a cover glass CG sandwiching therebetween the object P are located in front of the leading lens element of the forward lens group of the objective.

The radius of curvature of each of the lens elements and the slide glass as well as the cover glass and the air gaps between the respective adjacent two elements are designated as shown.

The radius of curvature $r_3$ of the air contacting surface of the leading lens element in the form of a thick concave meniscus is set so as to satisfy the following condition.

$$1.0 \leq \left(\frac{n_{d4}-1}{r_3}\right) F \leq 2.5$$

where:

$F$ = the focal length of the entire lens system of the objective, $n_{d4}$ = the refractive index of the leading lens element with respect to $d$ line.

The above-described large air gap $d_{12}$ is set so as to satisfying the following condition:

$$8.0 \geq \frac{d_{12}}{F} \geq 2.0$$

Following the requirements of the present invention described above, the last lens element, i.e. the sixth lens element in the forward lens group is made a convex meniscus, the convex surfaces of which is arranged to face to the object.

The last lens element is constructed so that the focal length $f_1$ thereof satisfies the following condition:

$$10 \leq \frac{f_1}{F}$$

In the embodiment shown, a cemented achromatic surface is provided in the above-described last lens element, the convex side of which is arranged to face to the object.

Also, the first air contacting surface at the side of the object and the rearmost air contacting surface of the rearward lens group are so arranged in accordance with the above-described requirements of the present invention that the convex sides of the above-described air contacting surfaces are directed toward the image side so that the rearward lens group is made in the form of a convex meniscus as a whole.

The resultant focal length $f_2$ of the rearward lens group as a whole is set so as to satisfy the following condition:

$$5.0 \leq \frac{f_2}{F}$$

Further, at least two achromatic surfaces are provided in each of the forward and rearward lens elements following the requirements of the present invention.

The following table shows the data of the above-described embodiment of the objective of the present invention. In the table $nd$ designates the refractive index with respect to $d$ line, while $Vd$ designates the Abbe's number with respect to $d$ line, $r$ and $d$ being the radius of curvature and the air gap, respectively.

TABLE

| | r | d | nd | Vd |
|---|---|---|---|---|
| 1 | ∞ | 0.17 | 1 | |
| 2 | ∞ | 0.209 | 1.5229 | 59.9 |
| 3 | −1.26 | 2.80 | 1 | |
| 4 | −2.21 | 0.05 | 1.486 | 81.5 |
| 5 | −14.4 | 0.40 | 1 | |
| 6 | 47.6 | 2.10 | 1.613 | 43.9 |
| 7 | −3.88 | 0.19 | 1.434 | 95.2 |
| 8 | 29.5 | 1.60 | 1 | |
| 9 | −7.71 | 0.10 | 1.434 | 95.2 |
| 10 | 12.6 | 0.80 | 1 | |
| 11 | 4.99 | 2.20 | 1.613 | 43.9 |
| 12 | 43.6 | 13.0 | 1.434 | 95.2 |
| 13 | −111.0 | 1.50 | 1 | |
| 14 | −15.5 | 0.20 | 1.434 | 95.2 |
| 15 | −224.0 | 1.00 | 1 | |
| 16 | 6.49 | 3.00 | 1.617 | 67.7 |
| 17 | −7.84 | 1.00 | 1.434 | 95.2 |
| 18 | −25.7 | | 1.487 | 70.0 |
| 19 | | | 1 | |

Remarks to the above table:
 Magnification = −40.0X
 Numerical Aperture N.A. = 0.85
 $F = 4.20$
 Petzval sum = 0.03 (This value is in the case of $F=1.0$)

As seen from the above, the Petzval sum of the objective of the present invention is very small in contrast to the value of about 1.3 which is obtained by the prior art apochromatic objective. And the numerical aperture N.A. of the objective of the present invention is sufficiently large.

The prior art objective of the magnification of 40X can provide the numerical value of only about 0.65. A prior art semiapochromatic objective can provide the numerical value of only about 0.75. This shows that a very light image can be obtained by the objective of the present invention.

Figure 2:
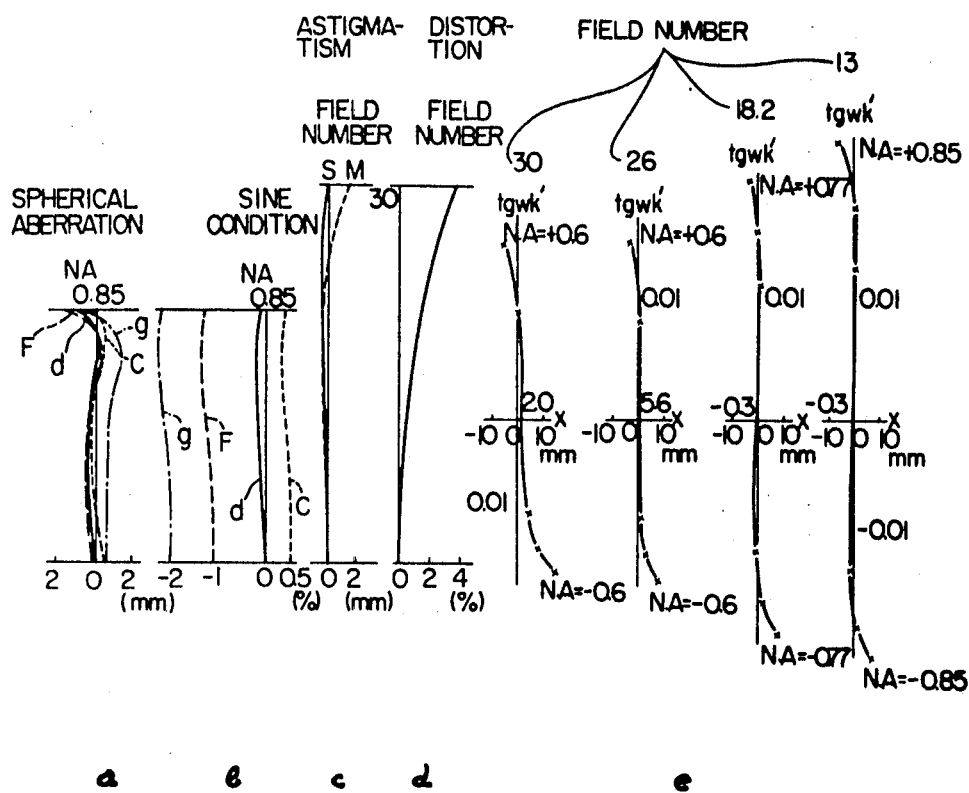
FIG. 2 shows various graphs of the various aberration curves obtained by the objective of FIG. 1.

FIG. 2 shows the various aberration curves of the embodiment of the objective of the present invention, and FIG. 2-a shows the spherical aberration curves, FIG. 2-b shows the sine-condition curves (OSC′), the solid lines being the aberration with respect to $d$ line, dotted lines being the aberration with respect to $c$ line, while the broken lines are the aberration with respect to $F$ line and one-dot chain lines are the aberration with respect to $g$ line.

As seen from FIG. 2-a, the spherical aberration of the objective of the present invention is very small, ranging within only ±2 mm. The OSC′ curve for $g$ line shown in FIG. 2-b is relatively large. However, since the $g$ line is a purple color having the wavelength near the ultraviolet region, the visibility factor of the $g$ line is relatively low. Therefore, the relatively large deviation of the sine-condition with respect to the $g$ line has practically no effect.

FIG. 2-c shows the astigmatism of the embodiment of the objective of the present invention. As is clear from FIG. 2-c the astigmatism is within the range of 2mm. over the wide field such as reaching the field number of 30. FIG. 2-d shows the distortion of the embodiment of the objective of the present invention. The distortion in FIG. 2-d is relatively large; however, the distortion is not serious in an objective for a microscope, since the distortion can be corrected by means of the eyepiece used in combination therewith. FIG. 2-e shows the coma appearing in the objectives having the field numbers 13, 18.2, 26 and 30, respectively. As is clear from these coma curves, the coma can be held to very small values in an objective constructed in accordance with the present invention. Although the coma is relatively large in the range near the field number of 30, the amount of such coma is widely improved in comparison with that of the prior art objectives.

As described above, in accordance with the present invention, it is clear that, in an objective of the present invention, the curvature of the field is sufficiently improved over the ultrawide field such as reaching the field number of 30, and a flat image surface is obtained, and, further, the second spectrum of the chromatic aberration can be completely eliminated over the sufficiently large aperture as is obtainable by an apochromatic objective.

Since the objective of the present invention utilizes only the fluorite instead of the alum, the designing and the manufacture of the objective of the present invention are made very easy thereby permitting the cost for production to be made very low while the durability of the same is very superior without deteriorating the performance thereof.

It should be understood that the present invention is not limited to the particular embodiment as described above but includes broadly all the modifications and variations which fall within the scope and spirit of the present invention as defined in the appended claims.

I claim:

1. A microscope objective comprising:
 a forward lens group consisting of six lens elements of which the second and third lens elements from the object side are cemented, and the fifth and sixth lens elements from the object side are cemented; and
 a rearward lens group consisting of:
 four lens elements of which the second, third, and fourth lens elements from the object side are cemented,
 said lens elements having substantially the numerical data set forth in the following table:

| | r | d | nd | Vd |
|---|---|---|---|---|
| 1 | ∞ | 0.17 | 1 | |
| 2 | ∞ | 0.209 | 1.5229 | 59.9 |
| 3 | −1.26 | 2.80 | 1 | |
| 4 | −2.21 | 0.05 | 1.486 | 81.5 |
| 5 | −14.4 | 0.40 | 1 | |
| 6 | 47.6 | 2.10 | 1.613 | 43.9 |
| 7 | −3.88 | 0.19 | 1.434 | 95.2 |
| 8 | 29.5 | 1.60 | 1 | |
| 9 | −7.71 | 0.10 | 1.434 | 95.2 |
| 10 | 12.6 | 0.80 | 1 | |
| 11 | 4.99 | 2.20 | 1.613 | 43.9 |
| 12 | 43.6 | 13.0 | 1.434 | 95.2 |
| 13 | −111.0 | 1.50 | 1 | |
| 14 | −15.5 | 0.20 | 1.434 | 95.2 |
| 15 | −224.0 | 1.00 | 1 | |
| 16 | 6.49 | 3.00 | 1.617 | 67.7 |
| 17 | −7.84 | 1.00 | 1.434 | 95.2 |
| 18 | −25.7 | | 1.487 | 70.0 |
| 19 | | | 1 | | where:
- $r$ = the respective radius of curvature of the elements of the objective,
- $d$ = the amount of the air gap between the respective adjacent two elements of the objective,
- $nd$ = the refractive index of each of the elements of the objective with respect to $d$ line, and
- $Vd$ = Abbe's number of each of the elements of the objective with respect to $d$ line the numerals designating the order of the arrangement from the object side.

UNITED STATES PATENT OFFICE
CERTIFICATE OF CORRECTION

Patent No. 3,572,902             Dated Mar. 30, 1971

Inventor(s) Toshifumi Uetake

It is certified that error appears in the above-identified patent and that said Letters Patent are hereby corrected as shown below:

On the cover sheet [54] "ACHROMATIC" should read -- APOCHROMATIC --.

Signed and sealed this 18th day of April 1972.

(SEAL)
Attest:

EDWARD M. FLETCHER, JR.                 ROBERT GOTTSCHALK
Attesting Officer                       Commissioner of Paten